US012617240B2

(12) United States Patent
Kikuchi

(10) Patent No.: US 12,617,240 B2
(45) Date of Patent: May 5, 2026

(54) TIRE

(71) Applicant: The Yokohama Rubber Co., LTD., Kanagawa (JP)

(72) Inventor: Hiroto Kikuchi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/851,459

(22) PCT Filed: Dec. 1, 2022

(86) PCT No.: PCT/JP2022/044412
§ 371 (c)(1),
(2) Date: Sep. 26, 2024

(87) PCT Pub. No.: WO2023/188542
PCT Pub. Date: Oct. 5, 2023

(65) Prior Publication Data
US 2025/0214378 A1 Jul. 3, 2025

(30) Foreign Application Priority Data

Mar. 31, 2022 (JP) ................................. 2022-060265

(51) Int. Cl.
*B60C 11/04* (2006.01)
*B60C 11/03* (2006.01)
(52) U.S. Cl.
CPC ......... *B60C 11/04* (2013.01); *B60C 2011/036* (2013.01); *B60C 2011/0367* (2013.01)

(58) Field of Classification Search
CPC ....... B60C 2011/036; B60C 2011/1209; B60C 2011/1213; B60C 2011/1227;
(Continued)

(56) References Cited

U.S. PATENT DOCUMENTS

2009/0090445 A1 4/2009 Itou
2009/0218020 A1* 9/2009 Sumi ..................... B60C 11/125
152/209.18
(Continued)

FOREIGN PATENT DOCUMENTS

EP 3 546 249 A1 10/2019
JP 5498466 B2 5/2014
(Continued)

*Primary Examiner* — Katelyn W Smith
*Assistant Examiner* — Wendy L Boss
(74) *Attorney, Agent, or Firm* — Thorpe North & Western

(57) ABSTRACT

In a tire, a middle land portion includes a first middle narrow groove having a linear shape or an arc shape and extending through the middle land portion and a second middle narrow groove having a Z-shape and extending through the middle land portion. A center land portion includes a first center narrow groove having one end at an edge portion of the center land portion, connected to a center main groove, and having an other end inside the center land portion and a second center narrow groove extending in a tire circumferential direction and having both ends inside the center land portion. The first center narrow groove is inclined in one direction of the tire circumferential direction from the one end toward the other end. The first and second center narrow grooves are arranged in a V-shape whose top portion is directed to the one direction.

19 Claims, 12 Drawing Sheets

(58) Field of Classification Search
CPC . B60C 2011/1254; B60C 11/04; B60C 11/12;
B60C 11/0302; B60C 11/124; B60C
11/1272; B60C 2011/0381
See application file for complete search history.

(56) References Cited

U.S. PATENT DOCUMENTS

2018/0015789 A1*  1/2018  Horiguchi ............. B60C 11/125
2021/0347210 A1   11/2021  Taniguchi
2022/0176747 A1*  6/2022  Harada ................... B60C 11/11

FOREIGN PATENT DOCUMENTS

JP        2018-8585  A     1/2018
JP        2018-203113  A    12/2018
JP        2019-167065  A    10/2019
JP        2021-176724  A    11/2021
WO     WO 2007/072717 A1    6/2007

* cited by examiner

TIRE WIDTH DIRECTION

TIRE WIDTH DIRECTION

| | Comparative Example | Example 1 | Example 2 | Example 3 | Example 4 | Example 5 |
|---|---|---|---|---|---|---|
| First center narrow groove | Extending through | Not extending through | Not extending through | Not extending through | Not extending through | Not extending through |
| Second center narrow groove | - | Not extending through | Not extending through | Not extending through | Not extending through | Not extending through |
| α° | 10 | 10 | 29 | 50 | 70 | 29 |
| β° | - | 0 | 0 | 0 | 0 | -40 |
| θ3° | - | 80 | 61 | 40 | 20 | 101 |
| Ds31/Wb3 | 1.00 (extending through) | 0.80 | 0.80 | 0.80 | 0.80 | 0.80 |
| Ls32/Ds31 | - | 0.25 | 0.25 | 0.25 | 0.25 | 0.25 |
| (Ds31 + Ls32)/Wb3 | 1.00 | 1.00 | 1.00 | 1.00 | 1.00 | 1.00 |
| First middle narrow groove | Extending through | Extending through | Extending through | Extending through | Extending through | Extending through |
| Second middle narrow groove | Extending through | Extending through | Extending through | Extending through | Extending through | Extending through |
| γ° | -10 | -10 | -10 | -10 | -10 | -10 |
| δ1° | -10 | -10 | -10 | -10 | -10 | -10 |
| δ2° | 0 | 0 | 0 | 0 | 0 | 0 |
| θ2° | 100 | 100 | 100 | 100 | 100 | 100 |
| Ls22/Wb2 | 0.09 | 0.09 | 0.09 | 0.09 | 0.09 | 0.09 |
| Ds22/Wb2 | 0.50 | 0.50 | 0.50 | 0.50 | 0.50 | 0.50 |
| Snow acceleration performance | 100 | 99 | 100 | 101 | 102 | 103 |
| Anti-lateral skid performance | 100 | 103 | 103 | 103 | 103 | 103 |
| Low rolling resistance performance | 100 | 101 | 101 | 102 | 102 | 102 |

FIG. 9A

| | Example 6 | Example 7 | Example 8 | Example 9 | Example 10 | Example 11 | Example 12 |
|---|---|---|---|---|---|---|---|
| First center narrow groove | Not extending through | Not extending through | Not extending through | Not extending through | Not extending through | Not extending through | Not extending through |
| Second center narrow groove | Not extending through | Not extending through | Not extending through | Not extending through | Not extending through | Not extending through | Not extending through |
| α° | 29 | 29 | 29 | 29 | 29 | 29 | 29 |
| β° | -15 | 10 | 25 | 40 | 10 | 10 | 10 |
| θ3° | 76 | 51 | 36 | 21 | 51 | 51 | 51 |
| Ds31/Wb3 | 0.80 | 0.80 | 0.80 | 0.80 | 0.65 | 0.50 | 0.40 |
| Ls32/Ds31 | 0.25 | 0.25 | 0.25 | 0.25 | 0.54 | 1.00 | 1.50 |
| (Ds31 + Ls32)/Wb3 | 1.00 | 1.00 | 1.00 | 1.00 | 1.00 | 1.00 | 1.00 |
| First middle narrow groove | Extending through | Extending through | Extending through | Extending through | Extending through | Extending through | Extending through |
| Second middle narrow groove | Extending through | Extending through | Extending through | Extending through | Extending through | Extending through | Extending through |
| γ° | -10 | -10 | -10 | -10 | -10 | -10 | -10 |
| δ1° | -10 | -10 | -10 | -10 | -10 | -10 | -10 |
| δ2° | 0 | 0 | 0 | 0 | 0 | 0 | 0 |
| θ2° | 100 | 100 | 100 | 100 | 100 | 100 | 100 |
| Ls22/Wb2 | 0.09 | 0.09 | 0.09 | 0.09 | 0.09 | 0.09 | 0.09 |
| Ds22/Wb2 | 0.50 | 0.50 | 0.50 | 0.50 | 0.50 | 0.50 | 0.50 |
| Snow acceleration performance | 103 | 103 | 103 | 103 | 102 | 102 | 98 |
| Anti-lateral skid performance | 103 | 103 | 103 | 103 | 104 | 104 | 104 |
| Low rolling resistance performance | 102 | 103 | 103 | 103 | 104 | 104 | 104 |

FIG. 9B

| | Example 13 | Example 14 | Example 15 | Example 16 | Example 17 | Example 18 | Example 19 | Example 20 |
|---|---|---|---|---|---|---|---|---|
| First center narrow groove | Not extending through | Not extending through | Not extending through | Not extending through | Not extending through | Not extending through | Not extending through | Not extending through |
| Second center narrow groove | Not extending through | Not extending through | Not extending through | Not extending through | Not extending through | Not extending through | Not extending through | Not extending through |
| α° | 29 | 29 | 29 | 29 | 29 | 29 | 29 | 29 |
| β° | 10 | 10 | 10 | 10 | 10 | 10 | 10 | 10 |
| θ3° | 51 | 51 | 51 | 51 | 51 | 51 | 51 | 51 |
| Ds31/Wb3 | 0.50 | 0.50 | 0.50 | 0.50 | 0.50 | 0.50 | 0.50 | 0.50 |
| Ls32/Ds31 | 1.20 | 0.80 | 0.60 | 0.80 | 0.80 | 0.80 | 0.80 | 0.80 |
| (Ds31 + Ls32)/Wb3 | 1.10 | 0.90 | 0.80 | 0.90 | 0.90 | 0.90 | 0.90 | 0.90 |
| First middle narrow groove | Extending through | Extending through | Extending through | Extending through | Extending through | Extending through | Extending through | Extending through |
| Second middle narrow groove | Extending through | Extending through | Extending through | Extending through | Extending through | Extending through | Extending through | Extending through |
| γ° | -10 | -10 | -10 | 10 | 18 | 26 | 18 | 18 |
| δ1° | -10 | -10 | -10 | 10 | 10 | 10 | 15 | 18 |
| δ2° | 0 | 0 | 0 | 0 | 0 | 0 | 0 | 0 |
| θ2° | 100 | 100 | 100 | 80 | 80 | 80 | 75 | 72 |
| Ls22/Wb2 | 0.09 | 0.09 | 0.09 | 0.09 | 0.09 | 0.09 | 0.09 | 0.09 |
| Ds22/Wb2 | 0.50 | 0.50 | 0.50 | 0.50 | 0.50 | 0.50 | 0.50 | 0.50 |
| Snow acceleration performance | 102 | 102 | 102 | 103 | 103 | 103 | 104 | 104 |
| Anti-lateral skid performance | 105 | 104 | 104 | 105 | 105 | 105 | 105 | 105 |
| Low rolling resistance performance | 105 | 105 | 105 | 105 | 105 | 105 | 105 | 105 |

FIG. 10A

| | Example 21 | Example 22 | Example 23 | Example 24 | Example 25 | Example 26 | Example 27 | Example 28 |
|---|---|---|---|---|---|---|---|---|
| First center narrow groove | Not extending through | Not extending through | Not extending through | Not extending through | Not extending through | Not extending through | Not extending through | Not extending through |
| Second center narrow groove | Not extending through | Not extending through | Not extending through | Not extending through | Not extending through | Not extending through | Not extending through | Not extending through |
| $\alpha°$ | 29 | 29 | 29 | 29 | 29 | 29 | 29 | 29 |
| $\beta°$ | 10 | 10 | 10 | 10 | 10 | 10 | 10 | 10 |
| $\theta 3°$ | 51 | 51 | 51 | 51 | 51 | 51 | 51 | 51 |
| Ds31/Wb3 | 0.50 | 0.50 | 0.50 | 0.50 | 0.50 | 0.50 | 0.50 | 0.50 |
| Ls32/Ds31 | 0.80 | 0.80 | 0.80 | 0.80 | 0.80 | 0.80 | 0.80 | 0.80 |
| (Ds31 + Ls32)/Wb3 | 0.90 | 0.90 | 0.90 | 0.90 | 0.90 | 0.90 | 0.90 | 0.90 |
| First middle narrow groove | Extending through | Extending through | Extending through | Extending through | Extending through | Extending through | Extending through | Extending through |
| Second middle narrow groove | Extending through | Extending through | Extending through | Extending through | Extending through | Extending through | Extending through | Extending through |
| $\gamma°$ | 18 | 18 | 18 | 18 | 18 | 18 | 18 | 18 |
| $\delta 1°$ | 26 | 15 | 15 | 15 | 15 | 15 | 15 | 15 |
| $\delta 2°$ | 0 | -20 | 6 | 20 | 35 | 6 | 6 | 6 |
| $\theta 2°$ | 64 | 95 | 69 | 55 | 40 | 69 | 69 | 69 |
| Ls22/Wb2 | 0.09 | 0.09 | 0.09 | 0.09 | 0.09 | 0.15 | 0.18 | 0.40 |
| Ds22/Wb2 | 0.50 | 0.48 | 0.50 | 0.52 | 0.53 | 0.51 | 0.51 | 0.52 |
| Snow acceleration performance | 104 | 104 | 104 | 104 | 104 | 104 | 104 | 104 |
| Anti-lateral skid performance | 105 | 105 | 105 | 105 | 105 | 106 | 106 | 106 |
| Low rolling resistance performance | 105 | 106 | 106 | 106 | 105 | 105 | 105 | 105 |

FIG. 10B

TIRE

TECHNICAL FIELD

The technology relates to a tire and particularly relates to a tire that can provide snow performance and low rolling resistance performance of the tire in a compatible manner.

To reduce tire rolling resistance, recent heavy duty tires employ a configuration in which a lateral groove extending through a middle land portion and a center land portion is a narrow groove having a groove width 3.0 mm or less. The technology described in Japan Patent No. 5498466 B is a known tire employing such a configuration. On the other hand, recent all-season tires need to ensure snow performance.

SUMMARY

The technology provides a tire that can provide snow performance and low rolling resistance performance of the tire in a compatible manner.

A tire according to an embodiment of the technology includes: a plurality of shoulder main grooves and two or more center main grooves; and a plurality of shoulder land portions, a pair of middle land portions, and one or more center land portions defined and formed by the shoulder main grooves and the center main grooves. At least one middle land portion of the middle land portions includes: a first middle narrow groove having a linear shape or an arc shape and extending through the middle land portion; and a second middle narrow groove having a Z-shape and extending through the middle land portion. The first middle narrow groove and the second middle narrow groove are alternately arranged in a tire circumferential direction. A center land portion of the center land portions includes: a first center narrow groove having one end at an edge portion of the center land portion, connected to a center main groove of the center main grooves, and having an other end inside the center land portion; and a second center narrow groove extending in the tire circumferential direction and having both ends inside the center land portion. The first center narrow groove is inclined in one direction of the tire circumferential direction from the one end toward the other end, and the first center narrow groove and the second center narrow groove are arranged in a V-shape whose top portion is directed to the one direction of the tire circumferential direction.

In the tire according to an embodiment of the present technology, (1) the middle land portion includes the second middle narrow groove having a Z-shape, thus edge components of the middle land portion are increased, and snow performance of the tire is improved as compared with a configuration in which all through narrow grooves have a linear shape or an arc shape. Further, (2) the center land portion includes the first and second center narrow grooves arranged in a V-shape, thus the rigidity of the center land portion is ensured, and tire rolling resistance is reduced as compared with a configuration in which the center land portion includes a through narrow groove. Furthermore, the first and second center narrow grooves arranged in a V-shape ensure edge components in both the tire circumferential direction and the tire width direction, and thus snow acceleration performance and anti-lateral skid performance of the tire are provided in a compatible manner. Therefore, there is an advantage of providing the snow performance and low rolling resistance performance of the tire in a compatible manner.

BRIEF DESCRIPTION OF DRAWINGS

FIGS. 9A-9B include a table showing results of performance tests of tires according to embodiments of the technology.

FIGS. 10A-10B include a table showing results of performance tests of tires according to embodiments of the technology.

DETAILED DESCRIPTION

Embodiments of the technology will be described in detail below with reference to the drawings. Note that the technology is not limited to the embodiments. Additionally, constituents of the embodiments include constituents that are substitutable and are obviously substitutes while maintaining consistency with the embodiments of the technology. Additionally, a plurality of modified examples described in the embodiments can be combined in a discretionary manner within the scope apparent to one skilled in the art.

Tire

Figure 1:
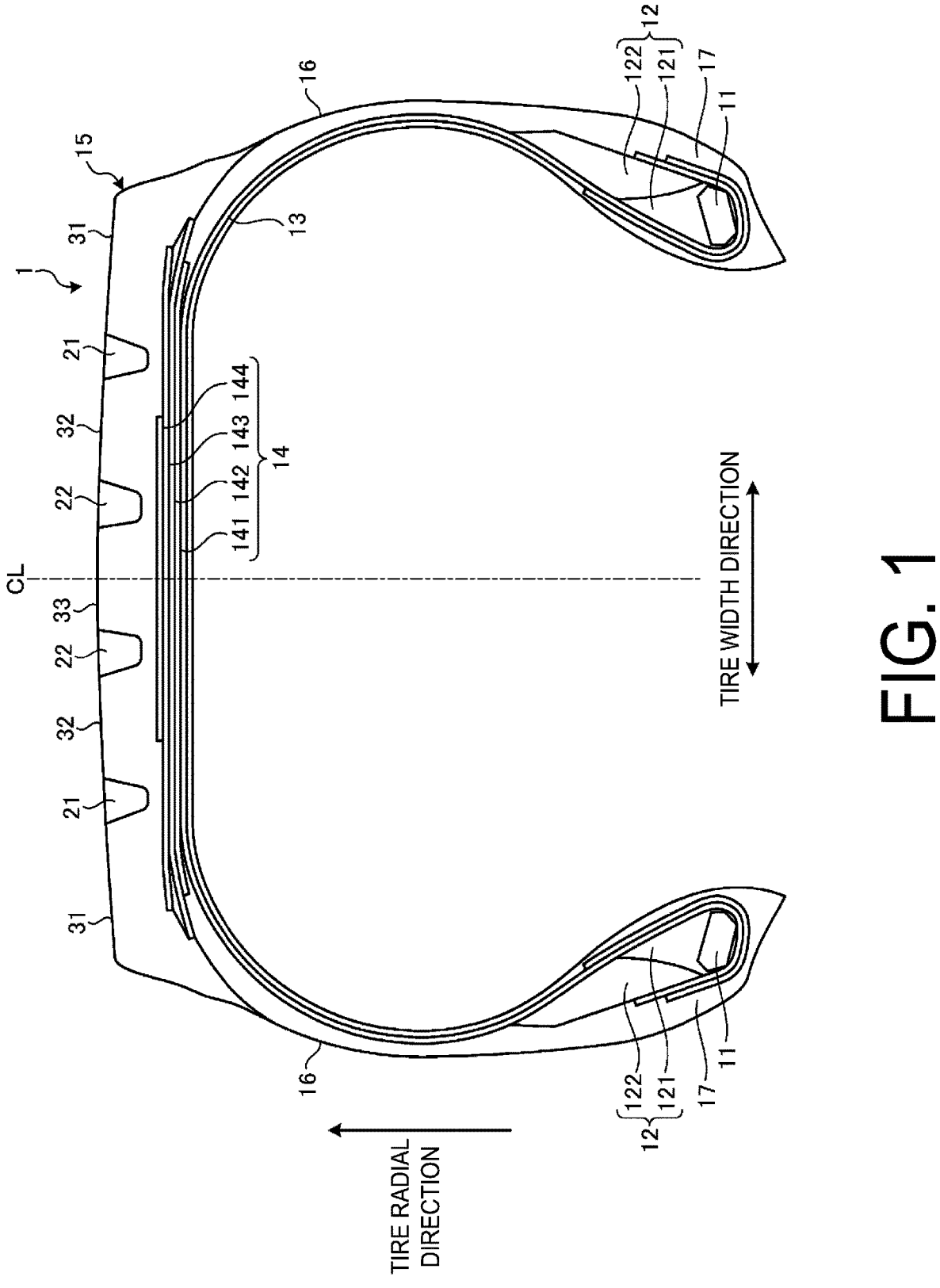
FIG. 1 is a cross-sectional view in a tire meridian direction illustrating a tire according to an embodiment of the technology.

FIG. 1 is a cross-sectional view in a tire meridian direction illustrating a tire 1 according to an embodiment of the technology. The same drawing illustrates a cross-sectional view of a half region in a tire radial direction. In this embodiment, a heavy duty pneumatic radial tire mounted on a steering axle of a long-distance transport vehicle such as a truck or bus will be described as an example of the tire.

In the same drawing, a cross-section in the tire meridian direction is defined as a cross-section of the tire taken along a plane that includes a tire rotation axis (not illustrated). Additionally, a tire equatorial plane CL is defined as a plane that passes through a midpoint of a tire cross-sectional width specified by the Japan Automobile Tyre Manufacturers Association Inc. (JATMA) and that is perpendicular to the tire rotation axis. Additionally, a tire width direction is defined as a direction parallel to the tire rotation axis, and the tire radial direction is defined as a direction perpendicular to the tire rotation axis.

The tire 1 includes an annular structure with the tire rotation axis being as the center, and includes a pair of bead cores 11, 11, a pair of bead fillers 12, 12, a carcass layer 13, a belt layer 14, a tread rubber 15, a pair of sidewall rubbers 16, 16, and a pair of nm cushion rubbers 17, 17 (see FIG. 1).

The pair of bead cores 11, 11 each include one or more of bead wires made of steel and made by being wound annularly multiple times, are embedded in bead portions, and constitute cores of the left and right bead portions. The pair of bead fillers 12, 12 are each made of a lower filler 121 and an upper filler 122, are disposed in respective outer circumferences of the pair of bead cores 11, 11 in the tire radial direction, and reinforce the bead portions.

The carcass layer 13 has a single layer structure including one carcass ply or a multilayer structure including a plurality of carcass plies layered, extends in a toroidal shape between the left and right bead cores 11, 11, and constitutes the backbone of the tire. Both end portions of the carcass layer 13 are turned back toward outer sides in the tire width direction and fixed to wrap the bead cores 11 and the bead fillers 12. Additionally, the carcass ply of the carcass layer 13 is constituted by covering, with coating rubber, a plurality of carcass cords made of steel and by performing a rolling process on the carcass cords and has a cord angle (defined as an inclination angle in a longitudinal direction of the carcass cords with respect to a tire circumferential direction) of 80 degrees or more and 90 degrees or less as an absolute value for a radial tire and 30 degrees or more and 45 degrees or less for a bias tire.

The belt layer 14 is made of a plurality of belt plies 141 to 144 being layered and is disposed around an outer circumference of the carcass layer 13. The belt plies 141 to 144 include a large-angle belt 141, a pair of cross belts 142, 143, and a belt cover 144. The large-angle belt 141 is constituted by covering, with coating rubber, a plurality of belt cords made of steel and by performing a rolling process on the belt cords and has a cord angle (defined as an inclination angle in a longitudinal direction of the belt cords with respect to the tire circumferential direction) of 45 degrees or more and 70 degrees or less as an absolute value. The pair of cross belts 142, 143 are constituted by covering, with coating rubber, a plurality of belt cords made of steel and by performing a rolling process on the belt cords and each have a cord angle of 10 degrees or more and 55 degrees or less as an absolute value. The pair of cross belts 142, 143 have cord angles having mutually opposite signs and are layered by making the belt cords mutually intersect in the longitudinal direction of the belt cords (a so-called crossply structure is formed). The belt cover 144 is constituted by covering, with coating rubber, a plurality of belt cover cords made of steel or an organic fiber material and by performing a rolling process on the belt cover cords and has a cord angle of 10 degrees or more and 55 degrees or less as an absolute value.

The tread rubber 15 is disposed on an outer circumference in the tire radial direction of the carcass layer 13 and the belt layer 14 and constitutes a tread portion of the tire 1. The pair of sidewall rubbers 16, 16 are each disposed on an outer side of the carcass layer 13 in the tire width direction and constitute left and right sidewall portions. The pair of rim cushion rubbers 17, 17 extend from an inner side in the tire radial direction of the left and right bead cores 11, 11 and turned back portions of the carcass layer 13 toward the outer side in the tire width direction, and constitute rim fitting surfaces of the bead portions.

Tread Surface

Figure 2:
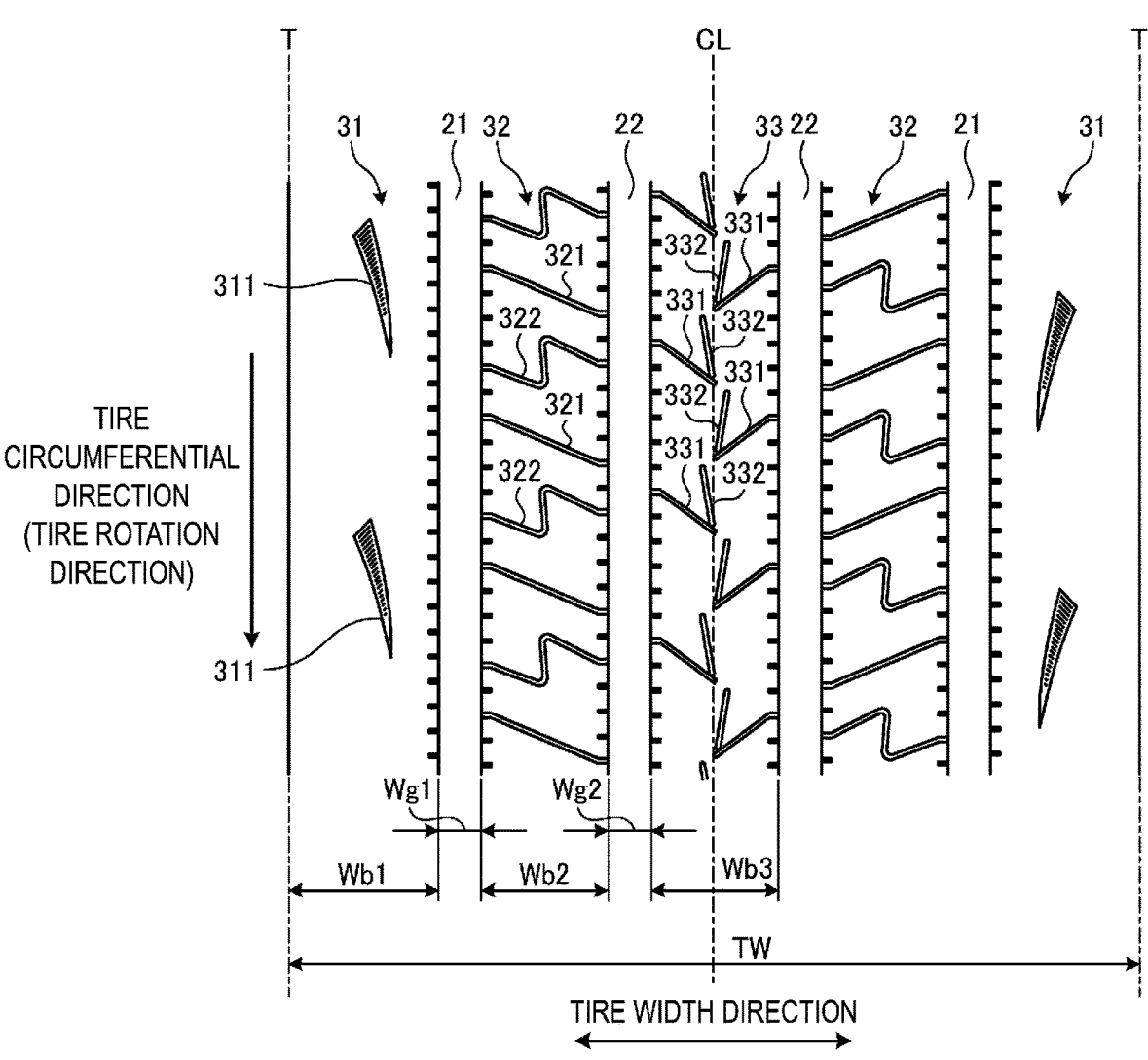
FIG. 2 is a plan view illustrating a tread surface of the tire illustrated in FIG. 1.

FIG. 2 is a plan view illustrating a tread surface of the tire 1 illustrated in FIG. 1. The same drawing illustrates a tread surface of an all-season tire having the mud-and-snow mark "M+S", and further the three-peak-mountain snowflake mark "3PMSF". In the same drawing, "tire circumferential direction" refers to the direction about the tire rotation axis. The reference sign T denotes a tire ground contact edge, and dimension symbol TW denotes a tire ground contact width. In the same drawing, the tire 1 includes a tread surface that is substantially axisymmetric with the tire equatorial plane CL as a center line, and thus a part of reference signs of constituents in a region on the right side in the drawing is omitted.

The tire 1 includes a rotation direction indicator portion (not illustrated) that indicates the tire rotation direction. "Tire rotation direction" refers to the rotation direction frequently used when the tire is in use and, for example, the rotation direction when the vehicle travels forward. Furthermore, based on the display of the rotation direction indicator portion, a ground contact leading side (so-called step-in side or toe side) and a ground contact trailing side (so-called kick-out side or heel side) of a block are defined (see FIG. 2). The step-in side is a side that contacts the ground first during rolling of the tire in a designated rotation direction, and the kick-out side is a side opposite to the step-in side. Note that the rotation direction indicator portion is formed of, for example, a mark or a recess/protrusion provided on the sidewall portion of the tire.

As illustrated in FIG. 2, the tire 1 includes, in the tread surface, four main grooves 21, 22 extending in the tire circumferential direction and five land portions 31 to 33 defined and formed by these main grooves.

The main grooves 21, 22 include a pair of shoulder main grooves 21, 21 and two center main grooves 22, 22. These main grooves 21, 22 have an annular structure continuously extending along the entire circumference of the tire. The shoulder main grooves 21, 21 are main grooves located on the outermost side in the tire width direction and are defined in respective left and right regions between which the tire equatorial plane CL lies as a boundary. The center main grooves 22, 22 are defined as main grooves closer to the tire equatorial plane CL side than the shoulder main grooves 21, 21 are.

"Main groove" refers to a groove having a wear indicator as specified by JATMA mandatorily provided.

The shoulder main groove 21 has a width Wg1 (see FIG. 2) of 5.0 mm or more and a depth (not illustrated) of 10 mm or more. The center main groove 22 has a width Wg2 (see FIG. 2) of 5.0 mm or more and a depth Hg2 (see FIG. described below) of 10 mm or more.

The groove width is measured as a maximum value of a distance between opposed groove walls of a groove opening portion on the tread contact surface when the tire is mounted on a specified rim, inflated to a specified internal pressure, and in an unloaded state. In a configuration in which the groove opening portion includes a notch portion or a chamfered portion, the groove width is measured by using, as end points, intersection points of an extension line of a tread contact surface and extension lines of the groove walls, in a cross-sectional view parallel to a groove width direction and a groove depth direction.

The groove depth is measured as the maximum value of a distance from the tread contact surface to the groove bottom when the tire is mounted on a specified rim, inflated to the specified internal pressure, and in an unloaded state. Additionally, in a configuration in which a groove bottom includes partial recess/protrusion portions or a sipe, the groove depth is measured excluding the partial recess/protrusion portions or the sipe.

"Specified rim" refers to a "standard rim" defined by JATMA, a "Design Rim" defined by the Tire and Rim Association, Inc. (TRA), or a "Measuring Rim" defined by the European Tyre and Rim Technical Organisation (ETRTO). The specified internal pressure refers to a "maximum air pressure" specified by JATMA, the maximum value in "TIRE LOAD LIMITS AT VARIOUS COLD INFLATION PRESSURES" specified by TRA, or "INFLATION PRESSURES" specified by ETRTO. The specified load refers to a "maximum load capacity" specified by JATMA, the maximum value in "TIRE LOAD LIMITS AT VARIOUS COLD INFLATION PRESSURES" specified by TRA, or "LOAD CAPACITY" specified by ETRTO. However, in JATMA, in the case of a tire for a passenger vehicle, the specified internal pressure is an air pressure of 180 kPa, and the specified load is 88% of the maximum load capacity at the specified internal pressure.

In the configuration of FIG. 2, a distance (dimension symbol omitted in the drawing) from the tire equatorial plane CL to a groove center line of each of the left and right shoulder main grooves 21, 21 is in the range 25% or more and 35% or less of a tire ground contact width TW.

The groove center line is defined as an imaginary line connecting midpoints of a distance between groove walls opposed to each other. In a case where the groove center line of the main groove has a zigzag shape or a wave-like shape (not illustrated), a distance to the groove center line is defined using, as a measurement point, the center of the amplitude of the groove center line.

The tire ground contact width TW is measured as a maximum linear distance in a tire axial direction in a contact surface between the tire and a flat plate when the tire is mounted on a specified rim, inflated to a specified internal pressure, placed perpendicular to the flat plate in a static state, and subjected to a load corresponding to a specified load.

A tire ground contact edge T is defined as the maximum width position in a tire axial direction on the contact surface between the tire and a flat plate when the tire is mounted on a specified rim, inflated to a specified internal pressure, placed perpendicular to the flat plate in a static state, and subjected to a load corresponding to a specified load.

The land portions 31 to 33 are formed of a pair of shoulder land portions 31, 31, a pair of middle land portions 32, 32, and one center land portion 33. The land portions 31 to 33 are defined and formed by the main grooves 21, 22, and form an annular road contact surface that extends along the entire circumference of the tire. The shoulder land portions 31, 31 are defined as land portions defined by the shoulder main grooves 21, 21 and located on the outer side in the tire width direction. The pair of shoulder land portions 31, 31 are disposed in the left and right regions between which the tire equatorial plane CL lies as a boundary. The middle land portions 32, 32 are defined as land portions defined by the shoulder main grooves 21, 21 and located on the inner side in the tire width direction. A pair of the middle land portions 32, 32 are disposed in the left and right regions between which the tire equatorial plane CL lies as a boundary. The center land portion 33 is defined as a land portion located closer to the tire equatorial plane CL side than the middle land portions 32, 32 are.

In FIG. 2, a ground contact width Wb1 of the shoulder land portion 31 with respect to the tire ground contact width TW is in the range $0.15 \leq Wb1/TW \leq 0.25$ and is preferably in the range $0.18 \leq Wb1/TW \leq 0.22$. Ground contact widths Wb2, Wb3 of the middle land portion 32 and center land portion 33 with respect to the tire ground contact width TW are in the ranges $0.13 \leq Wb2/TW \leq 0.17$ and $0.13 \leq Wb3/TW \leq 0.17$. The ground contact widths Wb2, Wb3 of the middle land portion 32 and center land portion 33 with respect to the ground contact width Wb1 of the shoulder land portion 31 are in the ranges $0.70 \leq Wb2/Wb1 \leq 0.90$ and $0.70 \leq Wb3/Wb1 \leq 0.90$. In such a configuration, the shoulder land portion 31 has a wide structure, and thus the rigidity of the shoulder land portion 31 is ensured, and uneven wear of the shoulder land portion 31 is effectively suppressed.

The ground contact width of the land portion is measured as a maximum linear distance in the tire axial direction in a contact surface between the land portion and a flat plate when the tire is mounted on a specified rim, inflated to a specified internal pressure, placed perpendicular to the flat plate in a static state, and loaded with a load corresponding to a specified load.

In the configuration of FIG. 2, the tire 1 includes the pair of shoulder main grooves 21, 21 and the two center main grooves 22, 22 as described above, and thus the pair of shoulder land portions 31, 31, the pair of middle land portions 32, 32, and the single center land portion 33 are defined. However, no such limitation is intended, and the tire 1 may include three or more center main grooves (not illustrated). In such a configuration, two or more rows of center land portions are defined. The center land portion 33 may be disposed on the tire equatorial plane CL (see FIG. 2) or may be disposed at a position away from the tire equatorial plane CL (not illustrated).

In the configuration of FIG. 2, the tire 1 has an axisymmetric tread pattern centered on the tire equatorial plane CL. Additionally, the tire 1 has a tread pattern having directionality in the tire rotation direction as described below.

In the configuration of FIG. 2, the shoulder main groove 21 and the center main groove 22 have a straight shape, and thus the left and right edge portions of the middle land portion 32 have a straight shape, and the left and right edge portions of the center land portion 33 have a straight shape. However, no such limitation is intended, and any main groove may have a zigzag shape or a step shape having an amplitude in the tire width direction, and thus the edge portion of the land portion may have a zigzag shape or a step shape (not illustrated).

Center Land Portion

Figure 3:
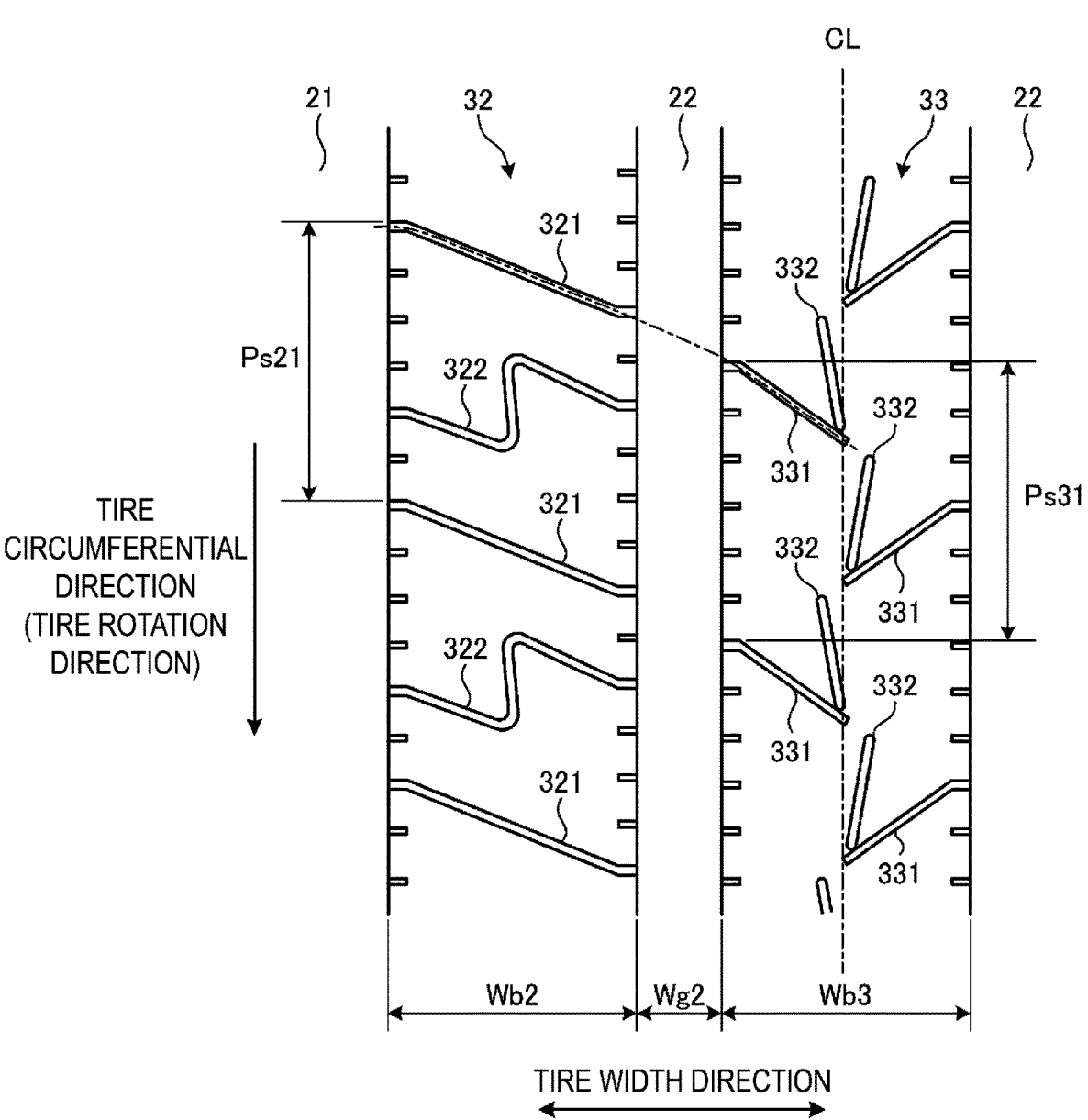
FIG. 3 is an enlarged view illustrating a middle land portion and a center land portion of the tire illustrated in FIG. 2.
Figure 4:
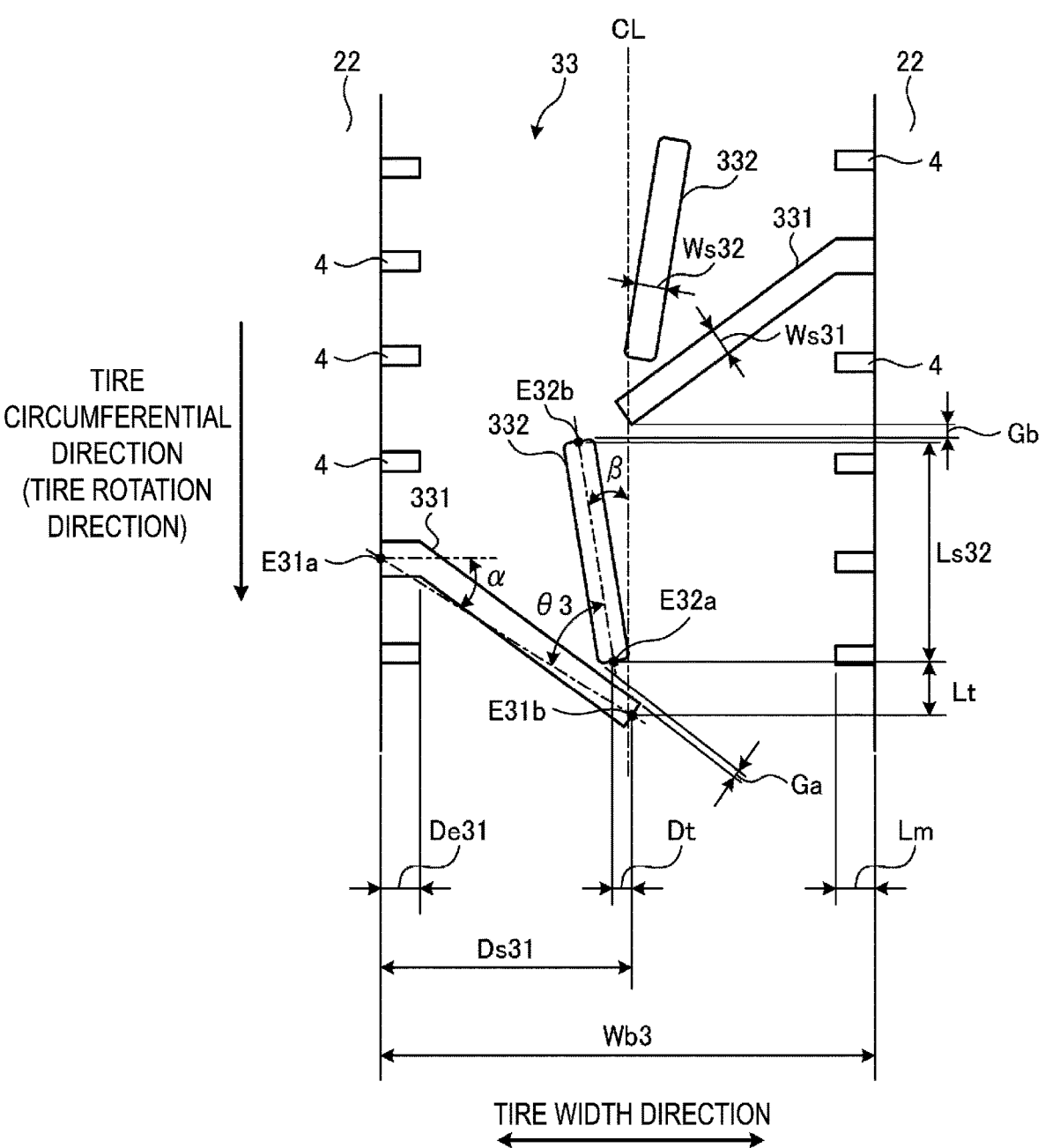
FIG. 4 is an enlarged plan view illustrating the center land portion illustrated in FIG. 3.
Figure 5:
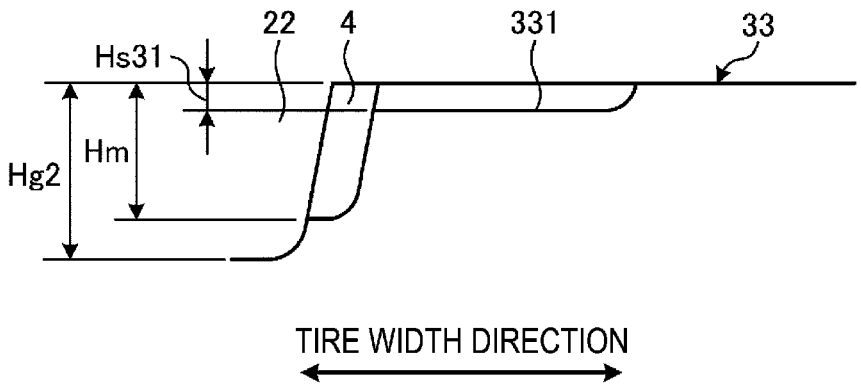
FIG. 5 is a cross-sectional view illustrating the center land portion illustrated in FIG. 3.

FIG. 3 is an enlarged view illustrating the middle land portion 32 and the center land portion 33 of the tire 1 illustrated in FIG. 2. FIGS. 4 and 5 are an enlarged plan view (FIG. 4) and a cross-sectional view (FIG. 5) illustrating the center land portion 33 illustrated in FIG. 3. FIG. 5 illustrates a cross-sectional view along a first center narrow groove 331 of the center land portion 33.

In the configuration of FIG. 2, as illustrated in FIG. 3, the center land portion 33 includes a groove unit consisting of the first center narrow groove 331 and a second center narrow groove 332. A plurality of pairs of groove units 331, 332 are arranged at predetermined intervals in the tire circumferential direction. In, for example, the configuration of FIG. 3, the plurality of groove units 331, 332 are arranged in a staggered manner in the tire circumferential direction.

The first and second center narrow grooves 331, 332 are non-through grooves, and do not extend through the center land portion 33 in the tire width direction. The center land portion 33 is a rib that includes a road contact surface continuous in the tire circumferential direction, and does not include other grooves or sipes extending through the center land portion 33 in the tire width direction. This ensures the rigidity of the center land portion 33 and reduces the tire rolling resistance.

As illustrated in FIG. 4, the first center narrow groove 331, which is a width direction groove mainly extending in the tire width direction, has one end at the edge portion of the center land portion 33, is connected to the center main groove 22, and has an other end inside the center land portion 33. A groove width Ws31 of the first center narrow groove 331 is in the range 1.5 mm≤Ws31≤3.0 mm. A groove depth Hs31 (see FIG. 5) of the first center narrow groove 331 is in the range 1.5 mm≤Hs31≤3.0 mm. The groove depth Hs31 of the first center narrow groove 331 with respect to a groove depth Hg2 of the center main groove 22 is in the range 0.05≤Hs31/Hg2≤0.15. Thus, the first center narrow groove 331 is a narrow shallow groove, and opens when the tire comes into contact with the ground and functions as a groove.

As illustrated in FIG. 4, the first center narrow groove 331 is inclined in one direction of the tire circumferential direction, specifically in the tire rotation direction from an end portion (end point E31a) on the edge portion side of the center land portion 33 toward an end portion (end point E31b) inside the center land portion 33. Thus, during rolling of the tire, the end portion in the center land portion 33 is the leading side, and the end portion on the edge portion side of the center land portion 33 is the trailing side. An inclination angle α of the first center narrow groove 331 with respect to the tire width direction is in the range 10 degrees≤α≤80 degrees and is preferably in the range 20 degrees≤α≤70 degrees. The lower limit described above ensures edge components with respect to the tire width direction of the first narrow groove 331, ensuring the anti-lateral skid performance of the tire, and the upper limit described above ensures edge components with respect to the tire circumferential direction of the first narrow groove 331, ensuring the snow traction performance of the tire.

The inclination angle α of the first center narrow groove 331 is measured as an angle formed between an imaginary straight line passing through the end points E31a, E31b of the first center narrow groove 331 and the tire width direction. The inclination in the tire rotation direction from the end portion (end point E31a) on the edge portion side of the center land portion 33 toward the end portion (end point E31b) in the center land portion 33 is defined as positive.

The end points E31a, E31b of the first center narrow groove 331 are defined as intersections of the groove center line of the first center narrow groove 331 and each of the end portion on the edge portion side of the center land portion 33 and the end portion in the land portion 33. Additionally, in a configuration in which the first center narrow groove 331 includes a notch portion or a chamfered portion at an end portion (not illustrated), the end points E31a, E31b are defined in the body of the groove excluding these portions.

In FIG. 4, an extension length Ds31 of the first center narrow groove 331 in the tire width direction with respect to the ground contact width Wb3 of the center land portion 33 is in the range 0.30≤Ds31/Wb3≤0.70 and preferably in the range 0.40≤Ds31/Wb3≤0.60. The lower limit described above ensures the edge components of the first center narrow groove 331, and the upper limit described above suppresses a decrease in rigidity of the center land portion 33 due to an excessive length of the first center narrow groove 331.

The extension length Ds31 of the first center narrow groove 331 is measured as a distance between the end points E31a and E31b of the first center narrow groove 331 in the tire width direction.

As illustrated in FIG. 4, the first center narrow groove 331 has a linear shape or an arc shape as a whole. Specifically, the first center narrow groove 331 includes a linear portion or an arc portion continuous over a length of 60% or more and preferably 70% or more of the extension length D31 in the tire width direction. The first center narrow groove 331 may include a partially bent portion or a curved portion near the end portion thereof (see FIG. 4).

For example, in the configuration of FIG. 4, the first center narrow groove 331 includes a short bent portion (the reference sign omitted in the drawing) near the opening portion (end point E31a) to the center main groove 22 so that the center narrow groove is connected substantially perpendicularly (90±5 degrees) to the edge portion of the center land portion 33. An extension length De31 of the bent portion in the tire width direction with respect to the ground contact width Wb3 of the center land portion 33 is in the range 0.05≤De31/Wb3≤0.20 and preferably in the range 0.06≤De31/Wb3≤0.15. Additionally, the extension length De31 of the bent portion is in the range 2.0 mm≤De31≤5.0 mm.

As illustrated in FIG. 4, the second center narrow groove 332 is mainly a circumferential groove extending in the tire circumferential direction, both ends of which are in the center land portion 33, that is, in the central portion of the center land portion 33. A groove width Ws32 of the second center narrow groove 332 is in the range 1.5 mm≤Ws32≤3.0 mm. A groove depth Hs32 (not illustrated) of the second center narrow groove 332 is in the range 1.5 mm≤Hs32≤3.0 mm. The groove depth Hs32 of the second center narrow groove 332 with respect to a groove depth Hg2 of the center main groove 22 is in the range 0.05≤Hs32/Hg2≤0.15. Thus, the second center narrow groove 332 is a narrow shallow groove, and opens when the tire comes into contact with the ground to function as a groove.

As illustrated in FIG. 4, the second center narrow groove 332 extends in the reverse direction of the tire rotation direction from the vicinity of the end portion (end point E31b) in the center land portion 33 of the first center narrow groove 331. An inclination angle β of the second center narrow groove 332 with respect to the tire circumferential direction is in the range 0 degrees≤|β|≤60 degrees and is preferably in the range 5 degrees≤|β|≤45 degrees. In such a configuration, the rigidity of the center land portion 33 is ensured and the rolling resistance of the tire is reduced, as compared to the configuration in which both the first and second center narrow grooves 331, 332 extend mainly in the tire width direction (not illustrated). Edge components of the second center narrow groove 332 improve the acceleration performance on snow of the tire.

As illustrated in FIG. 4, the second center narrow groove 332 is preferably inclined with respect to the tire circumferential direction and more preferably inclined in the same direction as the inclination direction of the first center narrow groove 331 with respect to the tire circumferential direction. Specifically, the second center narrow groove 332 is more preferably inclined on the first center narrow groove 331 side from the leading side toward the trailing side in the tire rotation direction. Additionally, the inclination angle β of the second center narrow groove 332 with respect to the tire circumferential direction is preferably in the range 5 degrees≤β≤45 degrees. The second center narrow groove

332 is inclined on the first center narrow groove 331 side, thereby reducing the tire rolling resistance.

The inclination angle β of the second center narrow groove 332 is measured as an angle formed between an imaginary straight line passing through end points E32$a$, E32$b$ of the second center narrow groove 332 and the tire circumferential direction. The inclination angle β is defined such that the same direction as the inclination direction of the first center narrow groove 331 with respect to the tire circumferential direction is positive. Specifically, the direction inclined on the first center narrow groove 331 side from the leading side to the trailing side in the tire rotation direction is defined as positive.

The end points E32$a$, E32$b$ of the second center narrow groove 332 are defined as intersection points between the groove center line of the second center narrow groove 332 and each of both end portions of the second center narrow groove 332. In a configuration (not illustrated) in which the second center narrow groove 332 includes notch portions or chamfered portions at the end portions thereof, the end points E32$a$, E32$b$ are defined in the body of the groove excluding these portions.

In FIG. 4, an inclination angle θ3 of the second center narrow groove 332 with respect to the first center narrow groove 331 is in the range 5 degrees≤θ3≤140 degrees and is preferably in the range 40 degrees≤θ3≤60 degrees. Thus, the first center narrow groove 331 and the second center narrow groove 332 are preferably disposed with the acute inclination angle θ3. The lower limit described above allows the first and second center narrow grooves 331, 332 to ensure the edge components in different directions, improving the snow performance of the tire, and the upper limit described above ensures the rigidity of the center land portion 33, reducing the tire rolling resistance.

The inclination angle θ3 is defined as an angle formed by the imaginary straight line passing through the end points E31$a$, E31$b$ of the first center narrow groove 331 and the imaginary straight line passing through the end points E32$a$, E32$b$ of the second center narrow groove 332.

In FIG. 4, an extension length Ls32 of the second center narrow groove 332 in the tire circumferential direction with respect to the ground contact width Wb3 of the center land portion 33 is in the range 0.10≤Ls32/Wb3≤0.70 and preferably in the range 0.20≤Ls32/Wb3≤0.60. Additionally, the extension length Ls32 of the second center narrow groove 332 in the tire circumferential direction with respect to the extension length Ds31 of the first center narrow groove 331 in the tire width direction is in the range 0.50≤Ls32/Ds31≤1.10 and more preferably in the range 0.60≤Ls32/Ds31≤1.00. This properly sets the balance of the extension lengths Ls32, Ds31 of the first and second center narrow grooves 331, 332.

The extension length Ls32 of the second center narrow groove 332 is measured as a distance between the end points E32$a$ and E32$b$ of the second center narrow groove 332 in the tire circumferential direction.

The extension length Ds31 of the first center narrow groove 331 and the extension length Ls32 of the second center narrow groove 332 described above with respect to the ground contact width Wb3 of the center land portion 33 are in the range 0.70≤(Ds31+Ls32)/Wb3≤0.95 and are preferably in the range 0.80≤(Ds31+Ls32)/Wb3≤0.95. The lower limit described above ensures the edge components of the first and second center narrow grooves 331, 332, ensuring the snow performance of the tire, and the upper limit described above ensures the rigidity of the center land portion 33, suppressing the degradation in the tire rolling resistance.

As illustrated in FIG. 4, the second center narrow groove 332 has a linear shape or an arc shape as a whole. Specifically, the second center narrow groove 332 includes a linear portion or an arc portion continuous over a length of 60% or more and preferably 70% or more of the extension length Ls32 in the tire circumferential direction. Thus, the second center narrow groove 332 may include a partially bent portion or curved portion near the end portion thereof (not illustrated). In the configuration of FIG. 4, the second center narrow groove 332 consists of a single straight line.

As illustrated in FIG. 4, the first center narrow groove 331 and the second center narrow groove 332 are arranged in a V-shape whose top portion is directed to one direction of the tire circumferential direction. Specifically, the first center narrow groove 331 is inclined in one direction of the tire circumferential direction from the end portion (end point E31$a$) on the edge portion side of the center land portion 33 toward the end portion (end point E31$b$) in the center land portion 33 as described above, and the second center narrow groove 332 extends in the reverse direction of the tire rotation direction from the vicinity of the end portion (end point E31$b$) in the center land portion 33 of the first center narrow groove 331, thus forming the V-shape described above.

In the configuration described above, the center land portion 33 includes the first and second center narrow grooves 331, 332 arranged in a V-shape, and thus the edge components of the center land portion 33 increase, improving the snow performance of the tire. Specifically, the first and second center narrow grooves 331, 332 arranged in a V-shape ensure the edge components in both the tire circumferential direction and the tire width direction, providing the snow acceleration performance and the anti-lateral skid performance of the tire in a compatible manner. Additionally, since the first and second center narrow grooves 331, 332 do not extend through the center land portion 33, the rigidity of the center land portion 33 is ensured, reducing the tire rolling resistance.

As illustrated in FIG. 4, the first center narrow groove 331 and the second center narrow groove 332 are disposed separated from each other. Thus, the second center narrow groove 332 is not connected to the first center narrow groove 331, and terminates inside the center land portion 33 at both ends thereof. In such a configuration, the first and second center narrow grooves 331, 332 are disposed separated from each other, and thus the rigidity of the center land portion 33 increases and the tire rolling resistance is effectively reduced compared to the configuration in which both the center narrow grooves are connected. A separation distance Ga between the first center narrow groove 331 and the second center narrow groove 332 is in the range 1.0 mm≤Ga≤2.5 mm. The lower limit described above ensures the rigidity of the center land portion 33, and the upper limit described above ensures the interaction of the first and second center narrow grooves 331, 332.

The separation distance Ga is measured as the minimum distance of the width of the road contact surface of the center land portion 33 between the first center narrow groove 331 and the second center narrow groove 332.

In FIG. 4, a distance Dt in the tire width direction between the end portion of the first center narrow groove 331 and the end portion of the second center narrow groove 332 at the top portion of the V-shape with respect to the extension length Ds31 of the first center narrow groove 331 in the tire width direction is in the range 0≤|Dt|/Ds31≤0.30 and more preferably in the range 0≤|Dt|/Ds31≤0.20. Thus, the end portions of the first and second center narrow grooves 331, 332 at the top portion of the V-shape are at substantially the same position in the tire width direction. This properly sets the arrangement of the V-shape of the first and second center narrow grooves 331, 332.

As illustrated in FIG. 4, the end portion of the second center narrow groove 332 at the top portion of the V-shape is preferably positioned further on the first center narrow groove 331 side than the end portion of the first center narrow groove 331. Specifically, in a projection view in the tire circumferential direction, the end portion of the second center narrow groove 332 is preferably overlapped with the extension region of the first center narrow groove 331 in the tire width direction (in other words, the range of the extension length Ds31). Additionally, the distance Dt in the tire width direction between the end portion of the first center narrow groove 331 and the end portion of the second center narrow groove 332 at the top portion of the V-shape is preferably in the range 0≤Dt/Ds31≤0.20.

The distance Dt is measured as a distance in the tire width direction between the end point E31b of the first center narrow groove 331 and the end point E32a of the second center narrow groove 332 at the top portion of the V-shape. The distance Dt is defined as positive in the direction from the end point E31b of the first center narrow groove 331 inside the center land portion 33 toward the end point E31a of the first center narrow groove 331 in the edge portion of the center land portion, in other words, in the direction in which the end portion of the second center narrow groove 332 overlaps the first center narrow groove 331.

In FIG. 4, a distance Lt in the tire circumferential direction between the end portion of the first center narrow groove 331 and the end portion of the second center narrow groove 332 at the top portion of the V-shape with respect to the extension length Ls32 of the second center narrow groove 332 in the tire circumferential direction is in the range 0≤|Lt|/Ls32≤0.50 and is preferably in the range 0≤|Lt|/Ls32≤0.30. Thus, the end portions of the first and second center narrow grooves 331, 332 at the top portion of the V-shape are at substantially the same position in the tire circumferential direction.

As illustrated in FIG. 4, the end portion of the second center narrow groove 332 at the top portion of the V-shape is preferably positioned on the trailing side in the tire rotation direction from the end portion of the first center narrow groove 331. Additionally, the distance Lt in the tire circumferential direction between the end portion of the first center narrow groove 331 and the end portion of the second center narrow groove 332 at the top portion of the V-shape is preferably in the range 0.10≤Lt/Ls32≤0.30.

The distance Lt is measured as a distance in the tire circumferential direction between the end point E31b of the first center narrow groove 331 and the end point E32a of the second center narrow groove 332 at the top portion of the V-shape. The distance Lt is defined as positive in the direction from the leading side toward the trailing side in the tire rotation direction.

In the configuration of FIG. 4, a plurality of groove units consisting of the first and second center narrow grooves 331, 332 are arranged separated from each other in the tire circumferential direction. Thus, the groove units 331, 332 and the groove units 331, 332 adjacent to each other are arranged so as not to overlap each other in a projection view in the tire width direction. This ensures the rigidity of the center land portion 33. A separation distance Gb between the groove units 331, 332 and the groove units 331, 332 adjacent to each other is in the range 1.0 mm≤Gb. The upper limit of the separation distance Gb is not particularly limited, but is restricted by other conditions.

The separation distance Gb is measured as the distance between the groove units 331, 332 and the groove units 331, 332 adjacent to each other in the projection view in the tire width direction. The separation distance Gb is defined as positive in the direction in which the groove units 331, 332 and the groove units 331, 332 adjacent to each other are separated. Thus, when the groove units 331, 332 and the groove units 331, 332 adjacent to each other in the projection view in the tire width direction overlap, the separation distance Gb satisfies Gb<0.

In the configuration of FIG. 3, the center land portion 33 includes the first center narrow groove 331 and the second center narrow groove 332 described above and a multisipe 4 described below, while it does not include other lateral grooves that open when the tire comes into contact with the ground, specifically lateral grooves having a groove width greater than 1.5 mm and a groove length greater than 10 mm. This ensures the ground contact area of the center land portion 33.

Middle Land Portion

Figure 6:
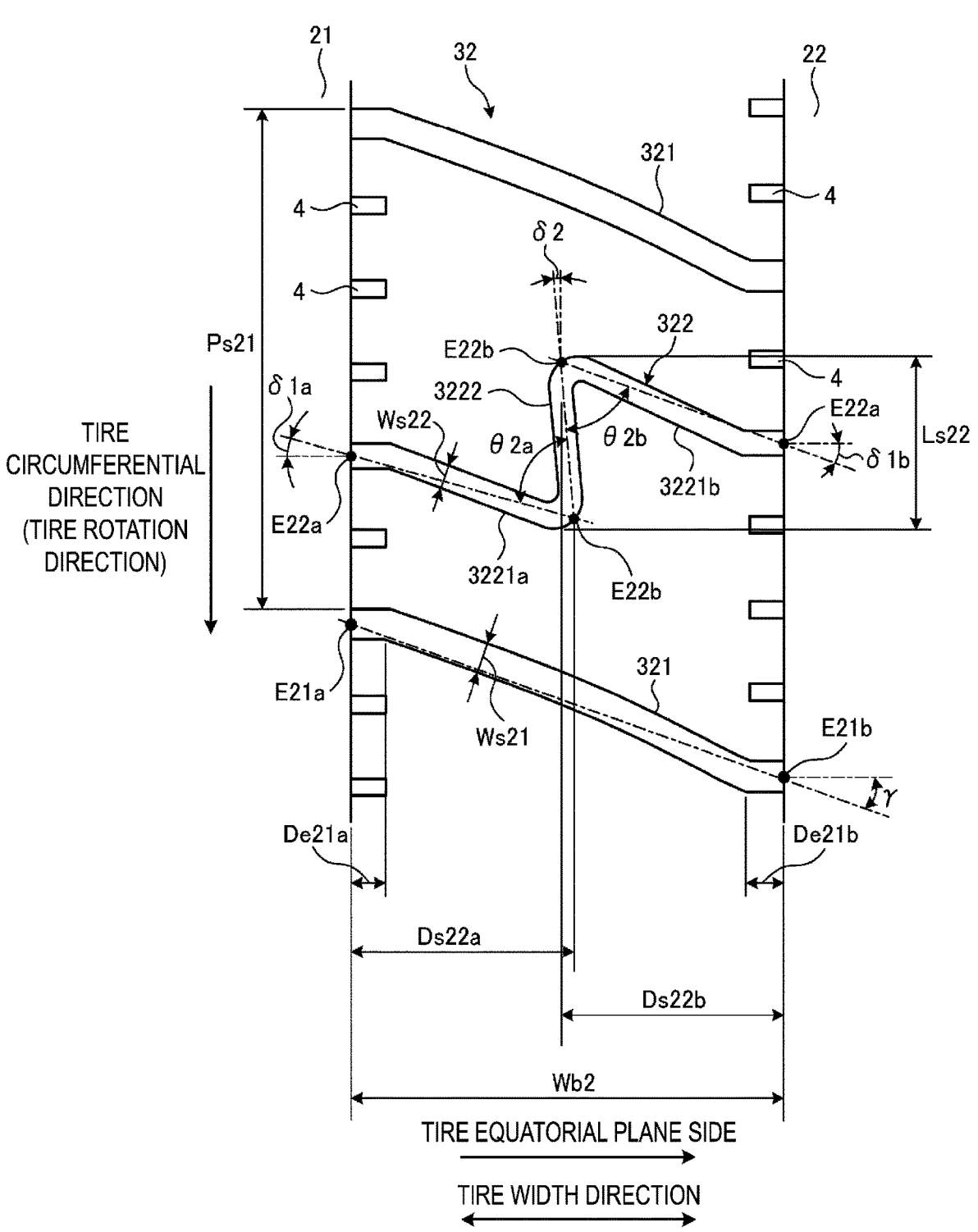
FIG. 6 is an enlarged plan view illustrating the middle land portion illustrated in FIG. 3.
Figure 7:
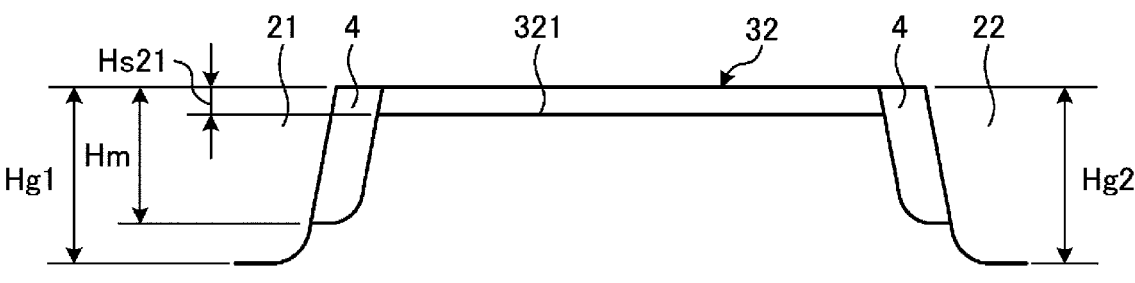
FIG. 7 is a cross-sectional view illustrating the middle land portion illustrated in FIG. 3.

FIGS. 6 and 7 are an enlarged plan view (FIG. 6) and a cross-sectional view (FIG. 7) illustrating the middle land portion 32 illustrated in FIG. 3. FIG. 7 illustrates a cross-sectional view along a first middle narrow groove 321 of the middle land portion 32.

In the configuration of FIG. 2, the middle land portion 32 includes the first middle narrow groove 321 and a second middle narrow groove 322. The first and second middle narrow grooves 321, 322 are arranged alternately in the tire circumferential direction.

The first and second middle narrow grooves 321, 322 are through lateral grooves, and extend through the middle land portion 32 in the tire width direction to connect to the left and right main grooves 21, 22. Thus, the middle land portion 32 forms a block row divided in the tire circumferential direction. This enhances the snow traction properties of the middle land portion 32.

In FIG. 6, a groove width Ws21 of the first middle narrow groove 321 is in the range 1.5 mm≤Ws21≤3.0 mm. A groove depth Hs21 (see FIG. 7) of the first middle narrow groove 321 is in the range 1.5 mm≤Hs21≤3.0 mm. The groove depth Hs21 of the first middle narrow groove 321 with respect to a groove depth Hg (Hg1, Hg2) of the main grooves 21, 22 is in the range 0.05≤Hs21/Hg≤0.15. Thus, the first middle narrow groove 321 is a narrow shallow groove, and opens when the tire comes into contact with the ground and functions as a groove.

As illustrated in FIG. 6, the first middle narrow groove 321 is inclined in one direction of the tire circumferential direction toward the tire equatorial plane CL side, specifically in the tire rotation direction. An inclination angle γ of the first middle narrow groove 321 with respect to the tire width direction is in the range 10 degrees≤γ≤45 degrees and is preferably in the range 15 degrees≤γ≤30 degrees.

The inclination angle γ of the first middle narrow groove 321 is measured as an angle formed between an imaginary straight line passing through end points E21a, E21b of the first middle narrow groove 321 and the tire width direction. The inclination angle γ is defined as positive in the same inclination direction as the first center narrow groove 331.

The end points E21$a$, E21$b$ of the first middle narrow groove 321 are defined as the intersection points between the groove center line of the first middle narrow groove 321 and both end portions of the first middle narrow groove 321. In a configuration (not illustrated) in which the first middle narrow groove 321 includes a notch portion or a chamfered portion at an end portion, the end points E21$a$, E21$b$ are defined in the body of the groove excluding these portions.

A pitch length Ps21 of the first middle narrow groove 321 with respect to the ground contact width Wb2 of the middle land portion 32 is in the range 0.80≤Ps21/Wb2≤1.20. The lower limit described above ensures the rigidity of the middle land portion 32, ensuring the low rolling resistance performance of the tire, and the upper limit described above ensures edge components of the first middle narrow groove 321, ensuring the snow performance of the tire.

In the configuration of FIG. 6, the first middle narrow groove 321 has a linear shape or an arc shape as a whole. The first middle narrow groove 321 may include a partially bent portion or a curved portion near the end portion thereof.

In, for example, the configuration of FIG. 6, the first middle narrow groove 321 includes short bent portions (the reference sign omitted in the drawing) near the opening portions (end points E21$a$, E21$b$) to the left and right main grooves 21, 22 so as to be connected substantially perpendicularly (90±5 degrees) to the edge portions of the middle land portion 32. Extension lengths De21 (De21$a$, De21$b$) of the bent portion in the tire width direction with respect to the ground contact width Wb2 of the middle land portion 32 are in the range 0.05≤De21/Wb2≤0.20 and preferably in the range 0.10≤De21/Wb2≤0.15. The extension length De21 of the bent portion is in the range 2.0 mm≤De21≤5.0 mm.

In FIG. 6, a groove width Ws22 of the second middle narrow groove 322 is in the range 1.5 mm≤Ws22≤3.0 mm. A groove depth Hs22 (not illustrated) of the second middle narrow groove 322 is in the range 1.5 mm≤Hs22≤3.0 mm. The groove depth Hs22 of the second middle narrow groove 322 with respect to the groove depths Hg (Hg1, Hg2) of the main grooves 21, 22 is in the range 0.05≤Hs22/Hg≤0.15. Thus, the second middle narrow groove 322 is a narrow shallow groove, and opens when the tire comes into contact with the ground and functions as a groove.

As illustrated in FIG. 6, the second middle narrow groove 322 has a Z-shape bent or curved in the tire circumferential direction. Thus, in the middle land portion 32, the first middle narrow groove 321 having a linear shape or an arc shape and the second middle narrow groove 322 having a Z-shape are arranged alternately in the tire circumferential direction. The second middle narrow groove 322 increases edge component of the middle land portion 32, improving the snow performance of the tire.

In FIG. 6, the second middle narrow groove 322 consists of a pair of first groove portions 3221$a$, 3221$b$ extending mainly in the tire width direction and a second groove portion 3222 extending mainly in the tire circumferential direction.

The pair of first groove portions 3221$a$, 3221$b$ each have one end at the edge portion of the middle land portion 32, are respectively connected to the shoulder main groove 21 and the center main groove 22, and have the other end inside the middle land portion 32. The pair of first groove portions 3221$a$, 3221$b$ are inclined in the same direction as the inclination direction of the first middle narrow groove 321, that is, in one direction of the tire circumferential direction toward the tire equatorial plane CL side, specifically in the tire rotation direction.

In FIG. 6, an inclination angle δ1 (δ1$a$, δ1$b$) of the pair of first groove portions 3221$a$, 3221$b$ with respect to the tire width direction is in the range 10 degrees≤δ1≤45 degrees and preferably in the range 12 degrees≤δ1≤30 degrees. The inclination angle δ1 of the pair of first groove portions 3221$a$, 3221$b$ with respect to the inclination angle γ of the first middle narrow groove 321 is in the range 0≤|δ1−γ|≤20 degrees. Accordingly, the inclination angle δ1 of the pair of first groove portions 3221$a$, 3221$b$ extends substantially in parallel with the inclination angle γ of the first middle narrow groove 321.

The inclination angles δ1 (δ1$a$, δ1$b$) of the first groove portions 3221$a$, 3221$b$ are measured as angles formed between imaginary straight lines passing through end points E22$a$, E22$b$ of the first groove portions 3221$a$, 3221$b$ and the tire width direction.

The end points E22$a$, E22$b$ of the first groove portions 3221$a$, 3221$b$ are defined as the end points and the bend point of an imaginary straight line when the entire second middle narrow groove 322 is approximated by the imaginary straight line bent in a Z-shape. In a configuration (not illustrated) in which the first groove portions 3221$a$, 3221$b$ include a notch portion or a chamfered portion at an end portion, the end points E22$a$, E22$b$ are defined in the body of the groove excluding these portions.

In FIG. 6, the inclination angles δ1$a$, δ1$b$ of the pair of first groove portions 3221$a$, 3221$b$ have a relationship 0≤|δ1$a$−δ1$b$|≤20 degrees, and preferably have a relationship 0≤|δ1$a$−δ1$b$|≤15 degrees. Accordingly, the pair of first groove portions 3221$a$, 3221$b$ extend substantially in parallel with each other.

In FIG. 6, extension lengths Ds22 (Ds22$a$, Ds22$b$) of the pair of first groove portions 3221$a$, 3221$b$ in the tire width direction with respect to the ground contact width Wb2 of the middle land portion 32 are in the range 0.30≤Ds22/Wb2≤0.70 and preferably in the range 0.40≤Ds22/Wb2≤0.60.

The extension lengths Ds22 (Ds22$a$, Ds22$b$) of the first groove portions 3221$a$, 3221$b$ are measured as distances between the end points E22$a$ and E22$b$ of the first groove portions 3221$a$, 3221$b$ in the tire width direction.

In FIG. 6, the extension lengths Ds22$a$, Ds22$b$ of the first groove portions 3221$a$, 3221$b$ with respect to the ground contact width Wb2 of the middle land portion 32 are in the range 0.70≤(Ds22$a$+Ds22$b$)/Wb2≤1.30 and preferably in the range 1.00≤(Ds22$a$+Ds22$b$)/Wb2≤1.10. Thus, the sum of the extension lengths Ds22$a$, Ds22$b$ of the first groove portions 3221$a$, 3221$b$ is preferably equal to or greater than the ground contact width Wb2 of the middle land portion 32, and further, the pair of first groove portions 3221$a$, 3221$b$ preferably overlap in the tire width direction. The lower limit described above increases the edge components of the middle land portion 32, and the upper limit described above ensures the rigidity of the middle land portion 32.

In the configuration of FIG. 6, the pair of first groove portions 3221$a$, 3221$b$ have a linear shape or an arc shape as a whole. The pair of first groove portions 3221$a$, 3221$b$ may include a partially bent portion or a curved portion near the end portion thereof.

In, for example, the configuration of FIG. 6, the pair of first groove portions 3221$a$, 3221$b$ include short bent portions (the reference sign omitted in the drawing) near the opening portions (end points E22$a$, E22$b$) to the left and right main grooves 21, 22 so as to be connected substantially perpendicularly (90±5 degrees) to the edge portions of the middle land portion 32. An extension lengths De22 (reference sign omitted in the drawing) of the bent portion in the tire width direction with respect to the ground contact width Wb2 of the middle land portion 32 is in the range $0.05 \le De22/Wb2 \le 0.20$ and preferably in the range $0.06 \le De22/Wb2 \le 0.15$. Additionally, the extension length De22 of the bent portion is in the range $2.0 \, \text{mm} \le De22 \le 5.0 \, \text{mm}$.

As illustrated in FIG. 6, the second groove portion 3222 extends mainly in the tire circumferential direction to connect the pair of first groove portions 3221a, 3221b. An inclination angle δ2 of the second groove portion 3222 with respect to the tire circumferential direction is preferably in the range $-30 \, \text{degrees} \le \delta2 \le 30 \, \text{degrees}$ and is preferably in the range $0 \, \text{degrees} \le \delta2 \le 15 \, \text{degrees}$.

The inclination angle δ2 of the second groove portion 3222 is measured as an angle formed between an imaginary straight line passing through end points E22b, E22b of the second groove portion 3222 and the tire circumferential direction. Additionally, the inclination angle δ2 is defined as positive in the direction in which the pair of first groove portions 3221a, 3221b overlap each other in the tire width direction.

The end points E22b, E22b of the second groove portion 3222 are defined as bend points of an imaginary straight line when the entire second middle narrow groove 322 is approximated by the imaginary straight line bent in a Z-shape.

In FIG. 6, inclination angles θ2 (θ2a, θ2b) of the second groove portion 3222 with respect to the pair of first groove portions 3221a, 3221b are in the range $50 \, \text{degrees} \le \theta2 \le 90 \, \text{degrees}$ and are preferably in the range $60 \, \text{degrees} \le \theta2 \le 80 \, \text{degrees}$. Thus, the second groove portion 3222 preferably connects to the pair of first groove portions 3221a, 3221b with acute inclination angles θ2. The inclination angles θ2a, θ2b of the second groove portion 3222 are in the range $0 \, \text{degrees} \le |\theta2a - \theta2b| \le 10 \, \text{degrees}$, and preferably both are substantially equal.

The inclination angles θ2 (θ2a, θ2b) are defined as bend angles of an imaginary straight line when the entire second middle narrow groove 322 is approximated by the imaginary straight line bent in the Z shape as described above.

In FIG. 6, an extension length Ls22 of the second groove portion 3222 in the tire circumferential direction with respect to the ground contact width Wb2 of the middle land portion 32 is in the range $0.10 \le Ls22/Wb2 \le 0.50$ and is preferably in the range $0.20 \le Ls22/Wb2 \le 0.40$. The lower limit described above ensures circumferential components of the second groove portion 3222, ensuring the snow performance of the tire, and the upper limit described above ensures the rigidity of the middle land portion 32, ensuring the low rolling resistance performance of the tire.

The extension length Ls22 of the second groove portion 3222 is measured as a distance between the end points E22b and E22b of the second groove portion 3222 in the tire circumferential direction.

In the configuration of FIG. 6, the second groove portion 3222 has a linear shape or an S-shape as a whole. Additionally, the second groove portion 3222 is connected to the pair of first groove portions 3221a, 3221b by smooth arcuate bent portions.

Figure 8:
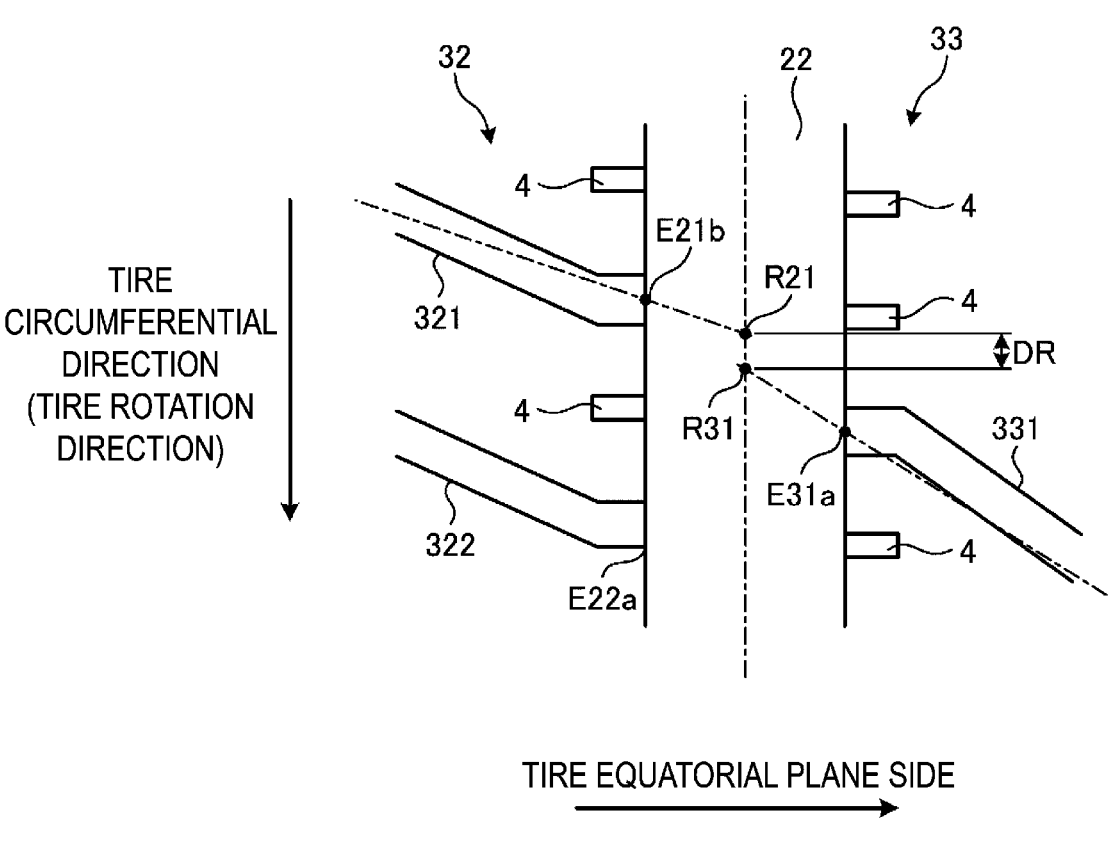
FIG. 8 is an enlarged view illustrating a center main groove illustrated in FIG. 3.

FIG. 8 is an enlarged view illustrating the center main groove 22 illustrated in FIG. 3. The same drawing illustrates opening portions of the first and second middle narrow grooves 321, 322 of the middle land portion 32 and an opening portion of the first center narrow groove 331 of the center land portion 33 with respect to the center main groove 22.

As illustrated in FIG. 2, in the middle land portion 32 and the center land portion 33 adjacent to each other across one center main groove 22, the pitch number N31 of the first center narrow groove 331 that opens to the center main groove 22 is equal to the pitch number N21 of the first middle narrow groove 321. The pitch number N21 of the first middle narrow groove 321 is in the range $30 \le N21 \le 50$.

As illustrated in FIG. 3, the first middle narrow groove 321 of the middle land portion 32 and the first center narrow groove 331 of the center land portion 33 are inclined in the same direction with respect to the tire width direction. The first center narrow groove 331 is on the extension line of the groove center line of the first middle narrow groove 321. Specifically, as illustrated in FIG. 8, an intersection point R21 of the imaginary straight line passing through both the end points E21a, E21b (see FIG. 6) of the first middle narrow groove 321 and the groove center line of the center main groove 22 is defined. An intersection point R31 of the imaginary straight line passing through both the end points E31a, E31b (see FIG. 4) of the first center narrow groove 331 and the groove center line of the center main groove 22 is defined. At this time, a distance DR between the intersection points R21 and R31 in the tire circumferential direction with respect to the pitch length Ps21 (see FIG. 3) of the first middle narrow groove 321 is in the range $0 \le |DR|/Ps21 \le 0.30$. This improves the snow discharge effect at the opening positions of the first middle narrow groove 321 and the first center narrow groove 331, improving the snow performance of the tire.

In the configuration of FIG. 3, the middle land portion 32 includes the first middle narrow groove 321 and the second middle narrow groove 322 described above and the multi-sipe 4 described below, while the middle land portion 32 does not include other lateral grooves that open when the tire comes into contact with the ground, specifically lateral grooves having a groove width greater than 1.5 mm and a groove length greater than 10 mm. This ensures the ground contact area of the middle land portion 32.

Shoulder Land Portion

The shoulder land portion 31 is a rib that includes a road contact surface continuous in the tire circumferential direction as illustrated in FIG. 2, and does not include other grooves or sipes extending through the shoulder land portion 31 in the tire width direction. Additionally, the shoulder land portion 31 has the ground contact width Wb1 that is wider than the ground contact widths Wb2, Wb3 of the middle land portion 32 and the center land portion 33 as described above. This ensures the rigidity of the shoulder land portion 31, reducing the tire rolling resistance.

As illustrated in FIG. 2, the shoulder land portion 31 includes a closed decorative groove 311 that terminates in the shoulder land portion 31. The decorative groove 311 has a groove depth less than 1.0 mm. A plurality of the decorative grooves 311 are arranged at predetermined intervals in the tire circumferential direction. In the configuration of FIG. 2, the decorative groove 311 has a triangular shape in which the groove width is widened from the leading side to the trailing side in the tire rotation direction.

As illustrated in FIG. 2, the shoulder land portion 31 includes the decorative groove 311 described above and the multisipe 4 described below, while the shoulder land portion 31 does not include other lateral grooves that open when the tire comes into contact with the ground, specifically lateral grooves having a groove width greater than 1.5 mm and a groove length greater than 10 mm. This ensures the ground contact area of the shoulder land portion 31.

Multisipe

In the configuration of FIG. 2, the shoulder land portion 31, the middle land portion 32, and the center land portion 33 each include a plurality of the multisipes 4 (reference sign omitted in FIG. 2; see FIGS. 4 and 6).

The multisipes 4, which are each a short sipe opening at one end to the edge portion of each of the land portions 31 to 33 and terminating at the other end inside each of the land portions 31 to 33, close when the tire comes into contact with the ground. The multisipe 4 has a width Wm (dimension symbol omitted in the drawing) of 0.3 mm or more and 1.5 mm or less, a depth Hm (see FIGS. 5 and 7) of 2.0 mm or more and 17 mm or less, and a length Lm (see FIG. 4) of 2.0 mm or more and 10 mm or less. The plurality of multisipes 4 are arranged in the tire circumferential direction along the edge portions of the land portions 31 to 33. A pitch length (dimension symbol omitted in the drawing) between the multisipes 4 with respect to the tire circumferential length is in the range 0.1% or more and 0.6% or less. In such a configuration, the multisipes 4 reduce the ground contact pressure of the edge portion of the land portion, suppressing uneven wear (in particular, river wear) of the land portion.

The width of the multisipe 4 is measured as an opening width of the sipe in the tread contact surface, when the tire is mounted on a specified rim, inflated to a specified internal pressure, and in an unloaded state.

The depth of the multisipe 4 is measured as a distance from the tread contact surface to a sipe bottom, when the tire is mounted on a specified rim, inflated to a specified internal pressure, and in an unloaded state. In a configuration in which the sipe partially includes, in the sipe bottom, a raised bottom portion or a recess/protrusion portion, the sipe depth is measured excluding the portions.

Groove Bottom Sipe

In the configuration of FIG. 3, at least a part of the first and second middle narrow grooves 321, 322 of the middle land portion 32 and at least a part of the first and second center narrow grooves 331, 332 of the center land portion 33 may include a groove bottom sipe (not illustrated). The groove bottom sipe has a width of 0.3 mm or more and 1.5 mm or less and a depth of 6.0 mm or more and 11 mm or less, thus closing when the tire comes into contact with the ground. This improves snow discharge properties of the land portions 32, 33.

The width and depth of the groove bottom sipe are measured as the width at the groove bottom of the narrow groove and the depth from the groove bottom of the narrow groove.

Effect

As described above, the tire 1 includes the pair of shoulder main grooves 21 and one or more center main grooves 22, and the pair of shoulder land portions 31, the pair of middle land portions 32, and one or more center land portions 33 defined and formed by the shoulder main grooves 21 and the center main grooves 22 (see FIG. 2). At least one of the middle land portions 32 includes the first middle narrow groove 321 having a linear shape or an arc shape and extending through the middle land portion 32 and the second middle narrow groove 322 having a Z-shape and extending through the middle land portion 32 (see FIG. 3). The first middle narrow groove 321 and the second middle narrow groove 322 are arranged alternately in the tire circumferential direction. The center land portion 33 includes the first center narrow groove 331 having one end at the edge portion of the center land portion 33, connected to the center main groove 22, and having an other end inside the center land portion 33 and the second center narrow groove 332 extending in the tire circumferential direction and having both ends inside the center land portion 33. The first center narrow groove 331 is inclined in one direction of the tire circumferential direction from the one end toward the other end. The first center narrow groove 331 and the second center narrow groove 332 are arranged in a V-shape whose top portion is directed to one direction of the tire circumferential direction.

In such a configuration. (1) the middle land portion 32 includes the second middle narrow groove 322 having the Z-shape, thus edge components of the middle land portion 32 are increased, and the snow performance of the tire is improved as compared with a configuration (not illustrated) in which all through narrow grooves have a linear shape or an arc shape. Further, (2) the center land portion 33 includes the first and second center narrow grooves 331, 332 arranged in a V-shape, thus the rigidity of the center land portion 33 is ensured, and the tire rolling resistance is reduced as compared with a configuration in which the center land portion 33 includes a through narrow groove. Furthermore, the first and second center narrow grooves 331, 332 arranged in a V-shape ensure edge components in both the tire circumferential direction and the tire width direction, and thus the snow acceleration performance and the anti-lateral skid performance of the tire are provided in a compatible manner. Therefore, there is an advantage of providing the snow performance and low rolling resistance performance of the tire in a compatible manner.

In the tire 1, the second middle narrow groove 322 consists of the pair of first groove portions 3221a, 3221b extending in the tire width direction and respectively opening to the shoulder main groove 21 and the center main groove 22 and the second groove portion 3222 extending in the tire circumferential direction and connecting the pair of first groove portions 3221a, 3221b (see FIG. 6). The extension length Ls22 of the second groove portion 3222 in the tire circumferential direction with respect to the ground contact width Wb2 of the middle land portion 32 is in the range $0.10 \leq \text{Ls22/Wb2} \leq 0.50$. The lower limit described above ensures circumferential components of the second groove portion 3222, and thus the snow performance of the tire is advantageously ensured. The upper limit described above ensures the rigidity of the middle land portion 32, and thus the low rolling resistance performance of the tire is advantageously ensured.

In the tire 1, the second middle narrow groove 322 consists of the pair of first groove portions 3221a, 3221b extending in the tire width direction and respectively opening to the shoulder main groove 21 and the center main groove 22 and the second groove portion 3222 extending in the tire circumferential direction and connecting the pair of first groove portions 3221a, 3221b (see FIG. 6). The extension lengths Ds22a, Ds22b of the pair of first groove portions 3221a, 3221b with respect to the ground contact width Wb2 of the middle land portion 32 are in the range $0.70 \leq (\text{Ds22a+Ds22b})/\text{Wb2} \leq 1.30$. The lower limit described above advantageously increases the edge components of the middle land portion 32, and the upper limit described above advantageously ensures the rigidity of the middle land portion 32.

In the tire 1, the center land portion 33 is a rib having a road contact surface continuous in the tire circumferential direction (see FIG. 3). In such a configuration, the rigidity of the center land portion 33 is ensured and the tire rolling resistance is advantageously reduced, as compared with the configuration (not illustrated) in which the center land portion is a block row divided in the tire circumferential direction by a through lateral groove.

In the tire 1, the extension length Ds31 of the first center narrow groove 331 in the tire width direction with respect to the ground contact width Wb3 of the center land portion 33 is in the range $0.30 \leq Ds31/Wb3 \leq 0.70$ (see FIG. 4). The lower limit described above ensures edge components of the first center narrow groove 331, and the upper limit described above advantageously suppresses a decrease in rigidity of the center land portion 33 due to an excessive length of the first center narrow groove 331.

In the tire 1, the pitch number of the first center narrow groove 331 that opens to the center main groove 22 is equal to the pitch number of the first middle narrow groove 321 in the middle land portion 32 and the center land portion 33 adjacent to each other across the center main groove 22 (see FIG. 2).

In the tire 1, the groove width Ws21 (see FIG. 6) of the first middle narrow groove 321 and the groove width Ws31 (see FIG. 4) of the first center narrow groove 331 are in the range 1.5 mm or more and 3.0 mm or less. The lower limit described above advantageously allows the narrow grooves 321, 331 to ensure the edge effect on snowy road surfaces, and the upper limit described above advantageously suppresses a decrease in rigidity of the land portions 32, 33 due to excessive enlargement of the groove width.

In the tire 1, the first middle narrow groove 321 and the first center narrow groove 331 are inclined in the same direction with respect to the tire width direction (see FIG. 3).

In the tire 1, the first center narrow groove 331 is on the extension line of the groove center line of the first middle narrow groove 321 (see FIG. 8). This improves the snow discharge effect at the opening positions of the first middle narrow groove 321 and the first center narrow groove 331, and thus the snow performance of the tire is advantageously improved.

In the tire 1, the shoulder land portion 31 is a rib having a road contact surface continuous in the tire circumferential direction. This ensures the rigidity of the shoulder land portion 31, and thus the tire rolling resistance is advantageously reduced.

The ground contact width Wb2 of the middle land portion 32 with respect to the ground contact width Wb1 of the shoulder land portion 31 is in the range $0.70 \leq Wb2/Wb1 \leq 0.85$. In such a configuration, the shoulder land portion 31 has a wide structure, and thus the rigidity of the shoulder land portion 31 is ensured, which is advantageous to effectively suppress uneven wear of the shoulder land portion 31.

The tire 1 includes an indicator portion (not illustrated) indicating the tire rotation direction (see FIG. 2). The first center narrow groove 331 is inclined in the tire rotation direction from the one end toward the other end (see FIG. 4). This properly sets the inclination direction of the first center narrow groove 331, that is, the orientation of the V-shape of the first and second center narrow grooves 331, 332, which is advantageous to suitably acquire the effect of improving snow performance by the first and second canter narrow grooves 331, 332.

Target of Application

The tire 1 is a heavy duty tire mounted on a steering axle of a vehicle. Targeting such a tire for application has the advantage of effectively achieving the effect of improving the snow performance and the low rolling resistance performance of the tire.

In the embodiments, a pneumatic tire is explained as an example of the tire as described above. However, no such limitation is intended, and the configurations described in the embodiments can also be applied to other tires in a discretionary manner within the scope apparent to one skilled in the art. Examples of other tires include an airless tire, and a solid tire.

EXAMPLE

FIGS. 9A through 10B are tables showing the results of performance tests of the tire 1 according to an embodiment of the technology.

In the performance tests, (1) snow acceleration performance, (2) anti-lateral skid performance, and (3) low rolling resistance performance were evaluated for a plurality of types of test tires. Test tires having a tire size of 315/70R22.5 were assembled on rims specified by ETRTO and specified internal pressure and specified load by ETRTO were applied to the test tires. The test tires are mounted on a 2-D tractor head that is a test vehicle.

(1) Evaluation of snow acceleration performance was performed by measuring the distance required for acceleration from a specified initial speed to a termination speed under test conditions conforming to R117-2 (Regulation No. 117 Revision 2) of the ECE (Economic Commission for Europe). Then, the measurement results are expressed as index values and evaluated, with Comparative Example being assigned as the reference (100). In this evaluation, larger values are preferable. If the evaluation is 98 or higher, it is deemed that the performance is properly ensured.

(2) In the evaluation of anti-lateral skid performance, the test vehicle was driven at a speed of 25 km/h on a snowy road surface, and the test driver performed a sensory evaluation. Then, the measurement results are expressed as index values and evaluated, with Comparative Example being assigned as the reference (100). In this evaluation, larger values are preferable.

(3) In the evaluation of low rolling resistance performance, a drum testing machine having a drum diameter of 1707 mm was used to measure the resistance at a load of 33.34 kN and a speed of 80 km/h. The evaluation is expressed as index values and evaluated, with Comparative Example being assigned as the reference (100). In the evaluation, larger values are preferable.

The test tires of Examples basically have the configurations of FIGS. 1 and 2. The middle land portion 32 includes the first and second middle narrow grooves 321, 322. The center land portion 33 includes the first and second center narrow grooves 331, 332 arranged in a V-shape. The groove units consisting of the first and second center narrow grooves 331, 332 are arranged in a staggered manner in the tire circumferential direction. The shoulder main groove 21 has the groove width Wg1 of 10.1 mm and the groove depth Hg1 of 12.1 mm. The center main groove 22 has the groove width Wg2 of 10.1 mm and the groove depth Hg2 of 12.1 mm. The tire ground contact width TW is 268 mm, the ground contact width Wb1 of the shoulder land portion 31 is 48.7 mm, the ground contact width Wb2 of the middle land portion 32 is 43.4 mm, and the ground contact width Wb3 of the center land portion 33 is 43.4 mm. The first and second middle narrow grooves 321, 322 and the first and second center narrow grooves 331, 332 each have a groove width of 2.0 mm and a groove depth of 1.5 mm.

In the test tire of Comparative Example, in the configuration of FIG. 2, the center land portion 33 does not include the second center narrow groove 332 extending in the circumferential direction, and all of the first center narrow grooves 331 extend through the center land portion 33 in the tire width direction, and thus the total number of narrow grooves extending through the center land portion is equal to the total number of the first and second middle narrow grooves 321, 322.

As can be seen from the test results, the snow acceleration performance, the anti-lateral skid performance, and the low rolling resistance performance of the tire are provided in a compatible manner in the test tires of Examples.

The invention claimed is:

1. A tire, comprising:
a plurality of shoulder main grooves and two or more center main grooves; and
a plurality of shoulder land portions, a pair of middle land portions, and one or more center land portions defined and formed by the shoulder main grooves and the center main grooves;
at least one middle land portion of the middle land portions comprising:
a first middle narrow groove having a linear shape or an arc shape and extending through the middle land portion; and
a second middle narrow groove having a Z-shape and extending through the middle land portion,
the first middle narrow groove and the second middle narrow groove being alternately arranged in a tire circumferential direction,
a center land portion of the center land portions comprising:
a first center narrow groove having one end at an edge portion of the center land portion, connected to a center main groove of the center main grooves, and having an other end inside the center land portion; and
a second center narrow groove extending in the tire circumferential direction and having both ends inside the center land portion,
the first center narrow groove being inclined in one direction of the tire circumferential direction from the one end toward the other end,
the first center narrow groove and the second center narrow groove being arranged in a V-shape whose top portion is directed to the one direction of the tire circumferential direction, and
the first middle narrow groove and the first center narrow groove being inclined in an identical direction with respect to a tire width direction.
2. The tire according to claim 1, wherein
the second middle narrow groove is made up of a pair of first groove portions extending in a tire width direction and a second groove portion extending in the tire circumferential direction, one of the first groove portions opening to a shoulder main groove of the shoulder main grooves and an other one of the first groove portions opening to the center main groove, the second groove portion connecting the pair of first groove portions, and
an extension length Ls22 of the second groove portion in the tire circumferential direction with respect to a ground contact width Wb2 of the middle land portion is in a range 0.10≤Ls22/Wb2≤0.50.
3. The tire according to claim 1, wherein
the second middle narrow groove is made up of a pair of first groove portions extending in a tire width direction and a second groove portion extending in the tire circumferential direction, one of the first groove portions opening to a shoulder main groove of the shoulder main grooves and an other one of the first groove portions opening to the center main groove, the second groove portion connecting the pair of first groove portions, and
extension lengths Ds22$a$, Ds22$b$ of the pair of first groove portions with respect to a ground contact width Wb2 of the middle land portion are in a range 0.70≤(Ds22$a$+Ds22$b$)/Wb2≤1.30.
4. The tire according to claim 1, wherein the center land portion is a rib having a road contact surface continuous in the tire circumferential direction.
5. The tire according to claim 1, wherein an extension length Ds31 of the first center narrow groove in a tire width direction with respect to a ground contact width Wb3 of the center land portion is in a range 0.30≤Ds31/Wb3≤0.70.
6. The tire according to claim 1, wherein in the middle land portion and the center land portion adjacent to each other across the center main groove, the pitch number of the first center narrow groove that opens to the center main groove is equal to the pitch number of the first middle narrow groove.
7. The tire according to claim 1, wherein groove widths of the first middle narrow groove and the first center narrow groove are in a range of 1.5 mm or more and 3.0 mm or less.
8. The tire according to claim 1, wherein the first center narrow groove is on an extension line of a groove center line of the first middle narrow groove.
9. The tire according to claim 1, wherein the shoulder land portion is a rib having a road contact surface continuous in the tire circumferential direction.
10. The tire according to claim 1, wherein a ground contact width Wb2 of the middle land portion with respect to a ground contact width Wb1 of the shoulder land portion is in a range 0.70≤Wb2/Wb1≤0.85.
11. The tire according to claim 1, comprising
an indicator portion indicating a tire rotation direction, wherein
the first center narrow groove is inclined in the tire rotation direction from the one end toward the other end.
12. The tire according to claim 2, wherein
the second middle narrow groove is made up of a pair of first groove portions extending in a tire width direction and a second groove portion extending in the tire circumferential direction, one of the first groove portions opening to a shoulder main groove of the shoulder main grooves and an other one of the first groove portions opening to the center main groove, the second groove portion connecting the pair of first groove portions, and
extension lengths Ds22$a$, Ds22$b$ of the pair of first groove portions with respect to a ground contact width Wb2 of the middle land portion are in a range 0.70≤(Ds22$a$+Ds22$b$)/Wb2≤1.30.

13. The tire according to claim 12, wherein the center land portion is a rib having a road contact surface continuous in the tire circumferential direction.

14. The tire according to claim 13, wherein an extension length Ds31 of the first center narrow groove in a tire width direction with respect to a ground contact width Wb3 of the center land portion is in a range $0.30 \leq Ds31/Wb3 \leq 0.70$.

15. The tire according to claim 14, wherein in the middle land portion and the center land portion adjacent to each other across the center main groove, the pitch number of the first center narrow groove that opens to the center main groove is equal to the pitch number of the first middle narrow groove.

16. The tire according to claim 15, wherein groove widths of the first middle narrow groove and the first center narrow groove are in a range of 1.5 mm or more and 3.0 mm or less.

17. The tire according to claim 16, wherein the first center narrow groove is on an extension line of a groove center line of the first middle narrow groove.

18. The tire according to claim 17, further comprising an indicator portion indicating a tire rotation direction, wherein
  the shoulder land portion is a rib having a road contact surface continuous in the tire circumferential direction,
  a ground contact width Wb2 of the middle land portion with respect to a ground contact width Wb1 of the shoulder land portion is in a range $0.70 \leq Wb2/ Wb1 \leq 0.85$, and
  the first center narrow groove is inclined in the tire rotation direction from the one end toward the other end.

19. A tire, comprising:
  a plurality of shoulder main grooves and two or more center main grooves; and a plurality of shoulder land portions, a pair of middle land portions, and one or more center land portions defined and formed by the shoulder main grooves and the center main grooves;
  at least one middle land portion of the middle land portions comprising:
  a first middle narrow groove having a linear shape or an arc shape and extending through the middle land portion; and
  a second middle narrow groove having a Z-shape and extending through the middle land portion,
  the first middle narrow groove and the second middle narrow groove being alternately arranged in a tire circumferential direction,
  a center land portion of the center land portions comprising:
  a first center narrow groove having one end at an edge portion of the center land portion, connected to a center main groove of the center main grooves, and having an other end inside the center land portion; and
  a second center narrow groove extending in the tire circumferential direction and having both ends inside the center land portion,
  the first center narrow groove being inclined in one direction of the tire circumferential direction from the one end toward the other end,
  the first center narrow groove and the second center narrow groove being arranged in a V-shape whose top portion is directed to the one direction of the tire circumferential direction, and
  the first center narrow groove being on an extension line of a groove center line of the first middle narrow groove.

\* \* \* \* \*